United States Patent
Nishio et al.

(10) Patent No.: US 12,430,946 B2
(45) Date of Patent: Sep. 30, 2025

(54) INFORMATION PROCESSING APPARATUS AND CONTROL METHOD

(71) Applicant: Lenovo (Singapore) Pte. Ltd., Singapore (SG)

(72) Inventors: Masashi Nishio, Kanagawa (JP); Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/442,279

(22) Filed: Feb. 15, 2024

(65) Prior Publication Data
US 2024/0273942 A1    Aug. 15, 2024

(30) Foreign Application Priority Data
Feb. 15, 2023    (JP) ................................. 2023-021449

(51) Int. Cl.
| | | |
|---|---|---|
| G06V 40/16 | (2022.01) | |
| G06F 1/16 | (2006.01) | |
| G06F 3/01 | (2006.01) | |
| G09G 3/20 | (2006.01) | |

(52) U.S. Cl.
CPC .......... *G06V 40/165* (2022.01); *G06F 1/1681* (2013.01); *G06F 3/012* (2013.01); *G09G 3/20* (2013.01); *G09G 2320/0626* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2010/0079371 A1* | 4/2010 | Kawakami | ............ | G06F 3/0485 345/156 |
| 2021/0132769 A1 | 5/2021 | Parikh et al. | | |
| 2022/0382359 A1 | 12/2022 | Kosugi | | |

FOREIGN PATENT DOCUMENTS

| | | |
|---|---|---|
| JP | 2005-221907 A | 8/2005 |
| JP | 2008-292753 A | 12/2008 |
| JP | 2011-61300 A | 3/2011 |
| JP | 2014-209739 A | 11/2014 |
| JP | 2016-148895 A | 8/2016 |
| JP | 2020-102151 A | 7/2020 |
| JP | 2022-534338 A | 7/2022 |
| JP | 2022-183484 A | 12/2022 |
| WO | 2011/033877 A1 | 3/2011 |

OTHER PUBLICATIONS

Extended European Search Report issued in corresponding European Patent Application No. 24150663.3, dated Jun. 25, 2024 (29 pages).

* cited by examiner

*Primary Examiner* — Nicholas J Lee
(74) *Attorney, Agent, or Firm* — Osha Bergman Watanabe & Burton LLP

(57) ABSTRACT

An information processing apparatus includes: a memory which temporarily stores image data of an image captured by an imaging unit; and a processor which processes the image data stored in the memory. The processor performs: face detection processing to process the image data of the image stored in the memory in order to detect a face area with a face captured therein and an orientation of the face from the image; and brightness control processing to control screen brightness of a display unit based on a position of the face area and the orientation of the face detected by the face detection processing.

9 Claims, 10 Drawing Sheets

INFORMATION PROCESSING APPARATUS AND CONTROL METHOD

CROSS-REFERENCE TO RELATED APPLICATIONS

This application claims priority to Japanese Patent Application No. 2023-021449 filed on Feb. 15, 2023, the contents of which are hereby incorporated herein by reference in their entirety.

TECHNICAL FIELD

The present invention relates to an information processing apparatus and a control method.

BACKGROUND

There is an apparatus which makes a transition to a usable state when a person approaches or to a standby state in which functions except some of the functions are stopped when the person moves away. For example, in Japanese Unexamined Patent Application Publication No. 2016-148895, it is detected whether a person is approaching or has moved away using an infrared sensor.

In recent years, with the development of computer vision and the like, detection accuracy when detecting a face from an image has been getting higher. Therefore, person detection by face detection is also performed in an information processing apparatus such as a personal computer instead of person detection by the infrared sensor. In the person detection by face detection, since the orientation of a face can also be detected in addition to simply detecting a person, control according to the orientation of the face (facing forward, facing sideways, or the like) can also be performed. For example, when the orientation of the face is not forward, the information processing apparatus determines that a user does not look at the display screen of the information processing apparatus and performs control to save power such as to reduce the screen brightness of the display screen.

However, conditions for the display screen of the information processing apparatus to come into a user's field of view (conditions under which it can be determined that the user is looking at the display screen) include not only the orientation of a face of the user, but also the position of the face which also affects the determination. For example, in a case where the face of the user is in a position facing near the center of the display screen, when the face of the user is facing forward, it can be determined that the user is looking at the display screen. On the other hand, when the position of the face of the user is moved away from the position facing near the center of the display screen to an edge, since the positional relationship of the face relative to the display screen changes, there may be a case where the user will not be looking at the display screen even if the face of the user is facing forward. Thus, there is a case where it cannot be properly detected whether or not the user is looking at the display screen only by the detection of the orientation of the face, and hence the control of the screen brightness of the display screen may result in unintended control.

SUMMARY

One or more embodiments of the present invention provide an information processing apparatus and a control method for properly detecting whether or not the user is looking at the display screen to control the screen brightness of the display screen.

An information processing apparatus according to one or more embodiments of the present invention includes: a memory which temporarily stores image data of an image captured by an imaging unit; and a processor which processes the image data stored in the memory, wherein the processor performs face detection processing to process the image data of the image stored in the memory in order to detect a face area with a face captured therein and an orientation of the face from the image, and brightness control processing to control the screen brightness of a display unit based on a position of the face area and the orientation of the face detected by the face detection processing.

The above information processing apparatus may also be such that the processor performs face direction determination processing to determine an orientation of the face relative to the display unit based on the position of the face area and the orientation of the face detected by the face detection processing, and in the brightness control processing, the processor controls the screen brightness of the display unit based on the determination result by the face direction determination processing.

The above information processing apparatus may further include: a first chassis on which the display unit is provided; and a second chassis connected to the first chassis through a hinge mechanism, wherein the information processing apparatus is foldable from a state where a first face of the first chassis with the display unit provided thereon and a second face of the second chassis are open to a direction in which the first face and the second face face each other depending on a change in hinge angle by the hinge mechanism, the processor further performs hinge angle detection processing to detect the hinge angle, and in the face direction determination processing, the processor determines the orientation of the face relative to the display unit based on the position of the face area and the orientation of the face detected by the face detection processing, and the hinge angle detected by the hinge angle detection processing.

The above information processing apparatus may further be such that the processor controls whether or not to perform the face direction determination processing based on the hinge angle detected by the hinge angle detection processing.

Further, the above information processing apparatus may be such that the processor further performs display direction detection processing to detect an orientation of the display unit, and in the face direction determination processing, the processor determines the orientation of the face relative to the display unit based on the position of the face area and the orientation of the face detected by the face detection processing, and the orientation of the display unit detected by the display direction detection processing.

Further, the above information processing apparatus may be such that the processor controls whether or not to perform the face direction determination processing based on the orientation of the display unit detected by the display direction detection processing.

Further, the above information processing apparatus may be such that the processor further performs external connection detection processing to detect connection with an external display device, and when it is detected by the external connection detection processing that the image processing apparatus is connected with the external display device, the processor determines, in the face direction determination processing, an orientation of the face relative to the external display device based on the position of the face area and the orientation of the face detected by the face detection processing, and a position of the external display device relative to the display unit.

Further, a control method according to one or more embodiments of the present invention is a control method for an information processing apparatus including: a memory which temporarily stores image data of an image captured by an imaging unit; and a processor which processes the image data stored in the memory, the control method including: a face detection step of causing the processor to process the image data of the image stored in the memory in order to detect a face area with a face captured therein and an orientation of the face from the image; and a brightness control step of causing the processor to control the screen brightness of a display unit based on a position of the face area and the orientation of the face detected by the face detection step.

The above aspects of the present invention can properly detect whether or not a user is looking at the display screen to control the screen brightness of the display screen.

DETAILED DESCRIPTION

Embodiments of the present invention will be described below with reference to the accompanying drawings.

First, an overview of an information processing apparatus 1 according to one or more embodiments will be described.

Figure 1:
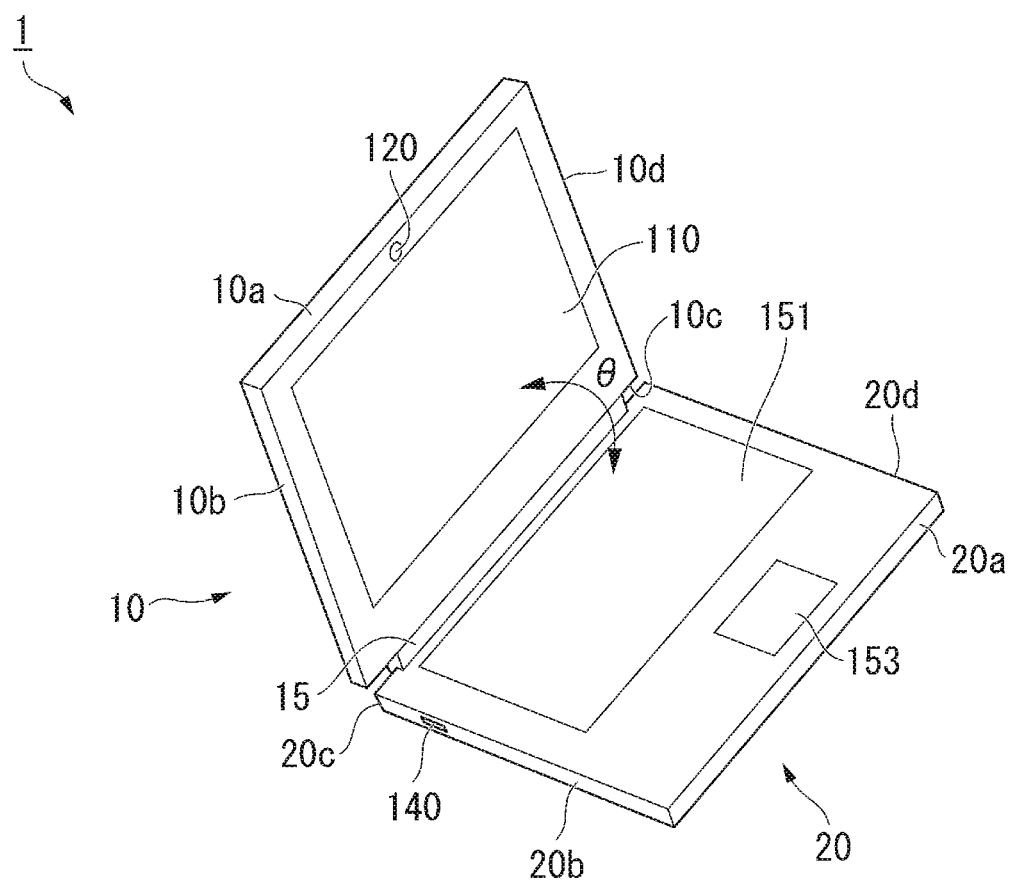
FIG. 1 is a perspective view illustrating an example of the appearance of an information processing apparatus according to one or more embodiments.

FIG. 1 is a perspective view illustrating a configuration example of the appearance of the information processing apparatus 1 according to one or more embodiments.

The information processing apparatus 1 is, for example, a laptop (clamshell) PC (Personal Computer). The information processing apparatus 1 includes a first chassis 10, a second chassis 20, and a hinge mechanism 15. The first chassis 10 and the second chassis 20 are joined by using the hinge mechanism 15. The first chassis 10 is rotatable around the rotation axis of the hinge mechanism 15 relative to the second chassis 20. A hinge angle (an open angle between the first chassis 10 and the second chassis 20) when the first chassis 10 and the second chassis 20 are rotated around the rotation axis of the hinge mechanism 15 is called a "hinge angle $\theta$."

The first chassis 10 is also called A cover or a display chassis. The second chassis 20 is also called C cover or a system chassis. Side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear" or "rearward," and the direction from the side face 20c to the side face 20a is referred to as "front" or "frontward." A side face 10b of the first chassis 10 and a side face 20b of the second chassis 20 are side faces on the right side toward the front, and a side face 10d of the first chassis 10 and a side face 20d of the second chassis 20 are side faces on the left side toward the front.

Further, a state where the first chassis 10 and the second chassis 20 overlap each other and are completely closed (a state of hinge angle $\theta=0°$) is referred to as a "closed state." The faces of the first chassis 10 and the second chassis 20 on the face-to-face sides in the closed state are referred to as respective "inner faces," and faces opposite to the inner faces are referred to as "outer faces." Further, a state opposite to the closed state, where the first chassis 10 and the second chassis 20 are open, is referred to as an "open state." The information processing apparatus 1 is foldable from the state where the inner face of the first chassis 10 and the inner face of the second chassis 20 are open to the direction in which the inner face of the first chassis 10 and the inner face of the second chassis 20 face each other depending on a change in hinge angle $\theta$ by the hinge mechanism 15.

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the hinge angle is typically about $\theta=100°$ to $130°$. Note that the range of hinge angles $\theta$ to be the open state can be determined arbitrarily according to the range of angles rotatable by the hinge mechanism 15, and the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can be directed in a direction facing a display screen of the display unit 110.

In the open state, the imaging unit 120 images a predetermined imaging range in the direction facing the display screen of the display unit 110 (that is, in front of the information processing apparatus 1). The predetermined imaging range is an angle-of-view range defined by an image sensor included in the imaging unit 120 and an optical lens provided in front of the imaging surface of the image sensor. For example, the imaging unit 120 can capture an image including a person (user) present in front of (on the front side of) the information processing apparatus 1.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is an operating state of a system capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, modern standby in Windows (registered trademark), or a state corresponding to S3 state (sleep state) defined in the ACPI specification. Further, a state in which at least the display of the display unit appears to be OFF (screen OFF), or a screen lock state may also be included as the standby state. The screen lock is a state in which an image preset to make a content being processed invisible (for example, an image for the screen lock) is displayed on the display unit, that is, an unusable state until the lock is released (for example, until the user is authenticated).

Further, a keyboard 151 and a touch pad 153 are provided on the inner face of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display screen of the display unit 110 may be constructed as a touch panel to accept operations. Further, a microphone used to input voice may be included in the input device.

Note that, in the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, and put in a state of being disabled from fulfilling the functions.

The information processing apparatus 1 executes HPD (Human Presence Detection) processing to detect a person present in front of the information processing apparatus 1 based on a captured image captured by the imaging unit 120.

Figure 2:
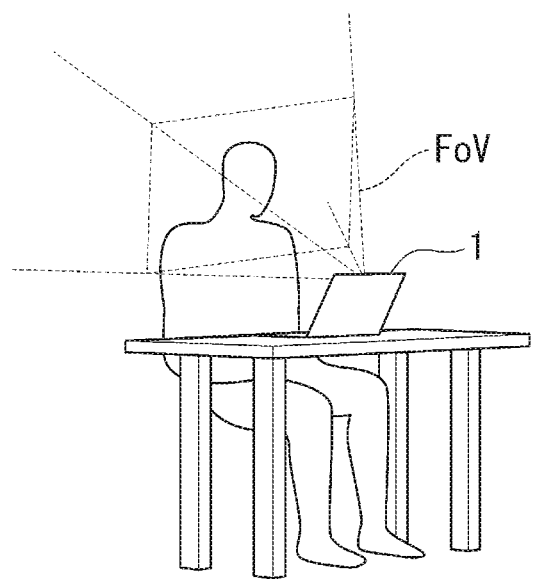
FIG. 2 is a diagram illustrating an example of a person detection range of the information processing apparatus according to one or more embodiments.

FIG. 2 is a diagram illustrating an example of a person detection range of the information processing apparatus 1 according to one or more embodiments. In the illustrated example, a detection range FoV (Field of View: detection viewing angle) in front of the information processing apparatus 1 is a person detectable range.

For example, the information processing apparatus 1 detects a face area with a face captured therein from the captured image captured by the imaging unit 120 to determine whether or not a person (user) is present in front of the information processing apparatus 1. The detection range FoV corresponds to an imaging angle of view of the information processing apparatus 1. When the face area is detected from the captured image, the information processing apparatus 1 determines that the person (user) is present. On the other hand, when no face area is detected from the captured image, the information processing apparatus 1 determines that no person (user) is present.

The information processing apparatus 1 controls the operating state of the system of the information processing apparatus 1 depending on the presence or absence of a person (user) by the HPD processing. For example, when a person (user) is present in front of the information processing apparatus 1, the information processing apparatus 1 controls the operating state to the normal operating state, while when no person (user) is present in front of the information processing apparatus 1, the information processing apparatus 1 controls the operating state to the standby state.

Note that when detecting a person present in front of the information processing apparatus 1 by detecting a face area with a face captured therein from the captured image captured by the imaging unit 120, the information processing apparatus 1 may regard the detected person as the user, or may perform face authentication processing to distinguish the user from any person other than the user in order to detect the user. In the following, the description will be made on the assumption that the person detected in front of the information processing apparatus 1 is the user.

Further, when determining that the user is present in front of the information processing apparatus 1, the information processing apparatus 1 detects the orientation of a face of the person relative to the display unit 110. The orientation of the face here can be represented, for example, by a face angle including a rotation angle (yaw angle) of the face in a yaw direction (left and right direction), and a rotation angle (pitch angle) of the face in a pitch direction (up and down direction).

Figure 3A:
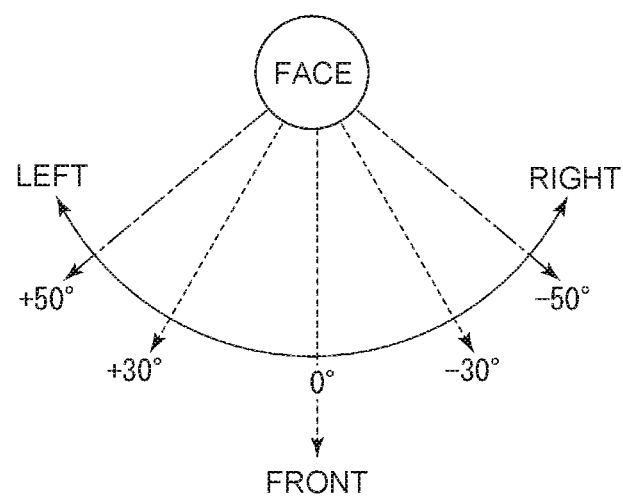
FIGS. 3A-3B are diagrams illustrating the definitions of face angles according to one or more embodiments.
Figure 3B:
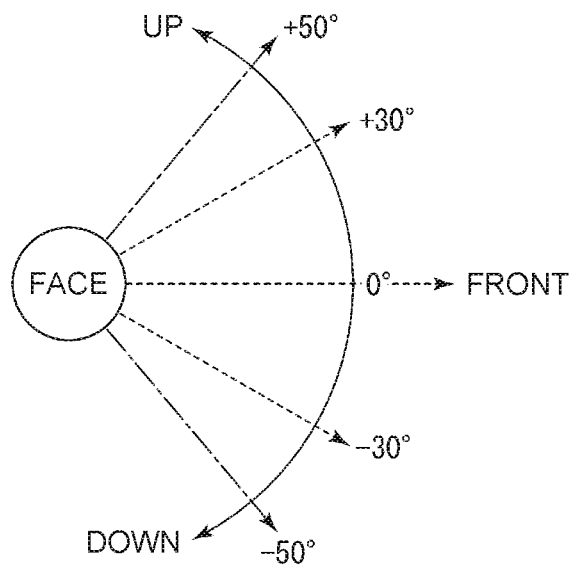

FIGS. 3A-3B are diagrams illustrating the definitions of face angles according to one or more embodiments. FIG. 3A illustrates the definitions of face angles in the yaw direction when the face is viewed from above, and FIG. 3B illustrates the definitions of face angles in the pitch direction when the face is viewed from the side. It is assumed that the face angle in the yaw direction is "0°" when the orientation of the face is forward relative to the display unit 110, a left direction toward the face is a positive (+) angle, and a right direction toward the face is a negative (−) angle. It is also assumed that the face angle in the pitch direction is "0°" when the orientation of the face is forward relative to the display unit 110, an upward direction toward the face is a positive (+) angle, and a downward direction toward the face is a negative (−) angle.

For example, the information processing apparatus 1 controls the screen brightness of the display unit 110 based on the orientation of the face relative to the display unit 110. Specifically, when the face is not facing the direction of the display unit 110, the information processing apparatus 1 determines that the user is not looking at the display screen of the display unit 110, and reduces the screen brightness of the display unit 110 to save power. Further, when the face turned to the direction of the display unit 110 again, the information processing apparatus 1 determines that the user is looking at the display screen of the display unit 110, and restores the screen brightness to the original screen brightness before being reduced.

In the following, the original screen brightness before being reduced is called the "standard brightness." Further, the screen brightness reduced from the standard brightness when the face is not facing the direction of the display unit 110 is called the "low brightness." The low brightness is lower than at least the standard brightness, but as the brightness becomes lower, the effect of power saving increases, and the contents being displayed are less likely to be seen from any person other than the user so that security can be improved. For example, the low brightness may be set to a brightness of about 0 to 10% of the standard brightness.

Further, when controlling the screen brightness, the information processing apparatus 1 may control the display of the display unit 110 to be turned on or off. For example, the information processing apparatus 1 may turn off the display of the display unit 110 to control the screen brightness to the low brightness. Further, the information processing apparatus 1 may turn on the display of the display unit 110 to restore the screen brightness from the low brightness to the standard brightness.

Figure 4:
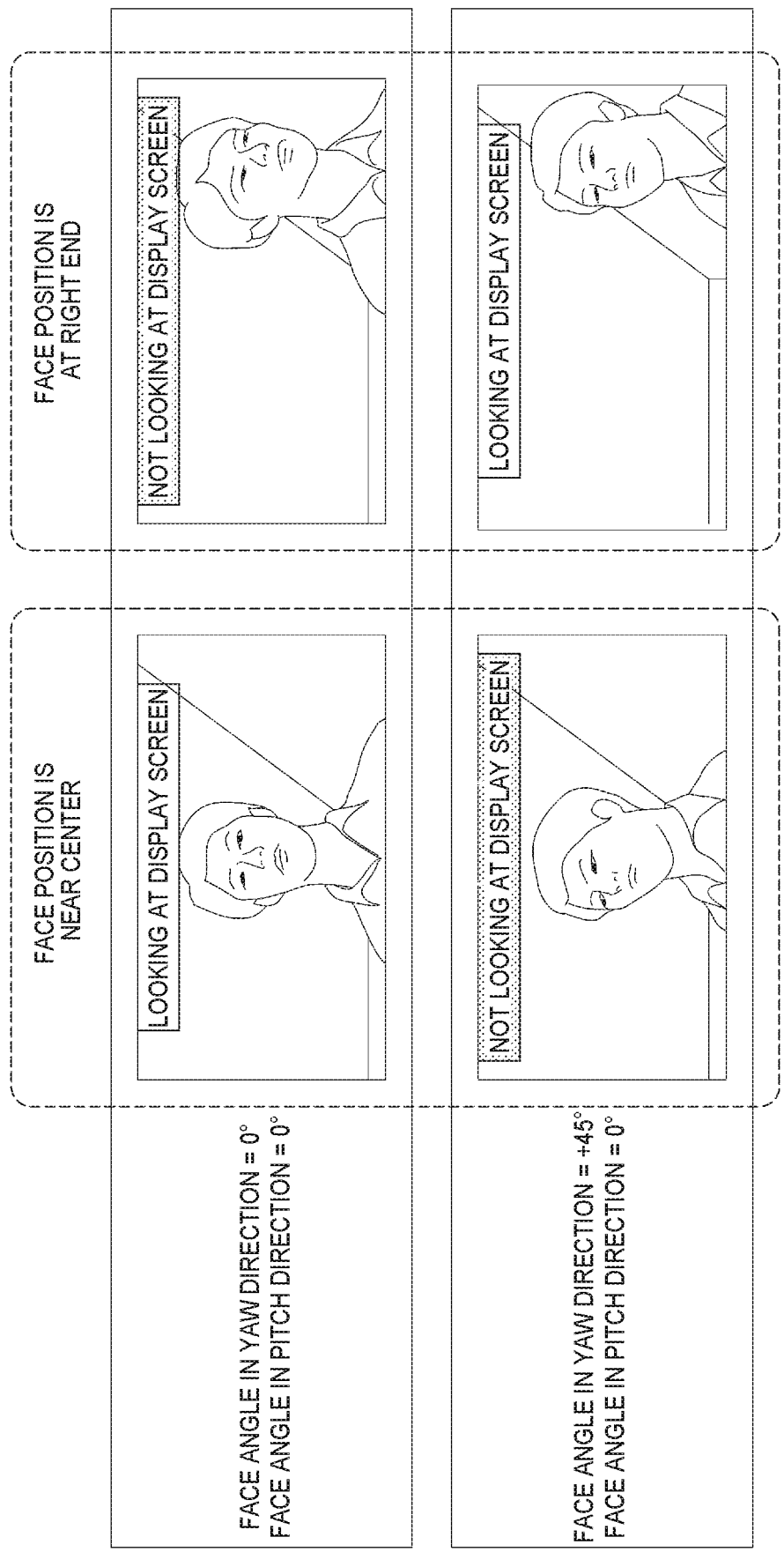
FIG. 4 is a diagram illustrating an example of a relationship between the position of a face and the orientation of the face relative to a display unit according to one or more embodiments.

Here, even when the face of the user is facing forward, there is a case where the face may not be facing the direction of the display unit 110 depending on the position of the face relative to the display unit 110, and hence the user may not be looking at the display screen. FIG. 4 is a diagram illustrating an example of a relationship between the position of a face relative to the display unit 110 and the orientation of the face according to one or more embodiments. As illustrated, when the face is facing forward in a case where both the face angle in the yaw direction and the face angle in the pitch direction are "0°," if the position of the face is near the center, it will be determined that the face is facing the direction of the display unit 110 and the user is looking at the display screen. On the other hand, when the position of the face is at the right end, since the face is not facing the direction of the display unit 110 even if the face is facing forward, it will be determined that the user is not looking at the display screen.

Further, when the face is facing the left direction in a case where the face angle in the yaw direction is "0°" and the face angle in the pitch direction is "+45°," if the position of the face is near the center, since the face will not be facing the direction of the display unit 110, it is determined that the user is not looking at the display screen. On the other hand, when the position of the face is at the right end, since the face is facing the direction of the display unit 110 even if the face is facing the left direction, it will be determined that the user is looking at the display screen.

Therefore, the information processing apparatus 1 determines the orientation of the face relative to the display unit 110 based on the position of the face area and the orientation of the face (face angle) detected from the captured image captured by the imaging unit 120 to control the screen brightness of the display unit 110. A face direction determination method of determining the orientation of the face relative to the display unit 110 based on the position of the face area and the orientation of the face (face angle) will be described with reference to FIG. 5.

Figure 5:
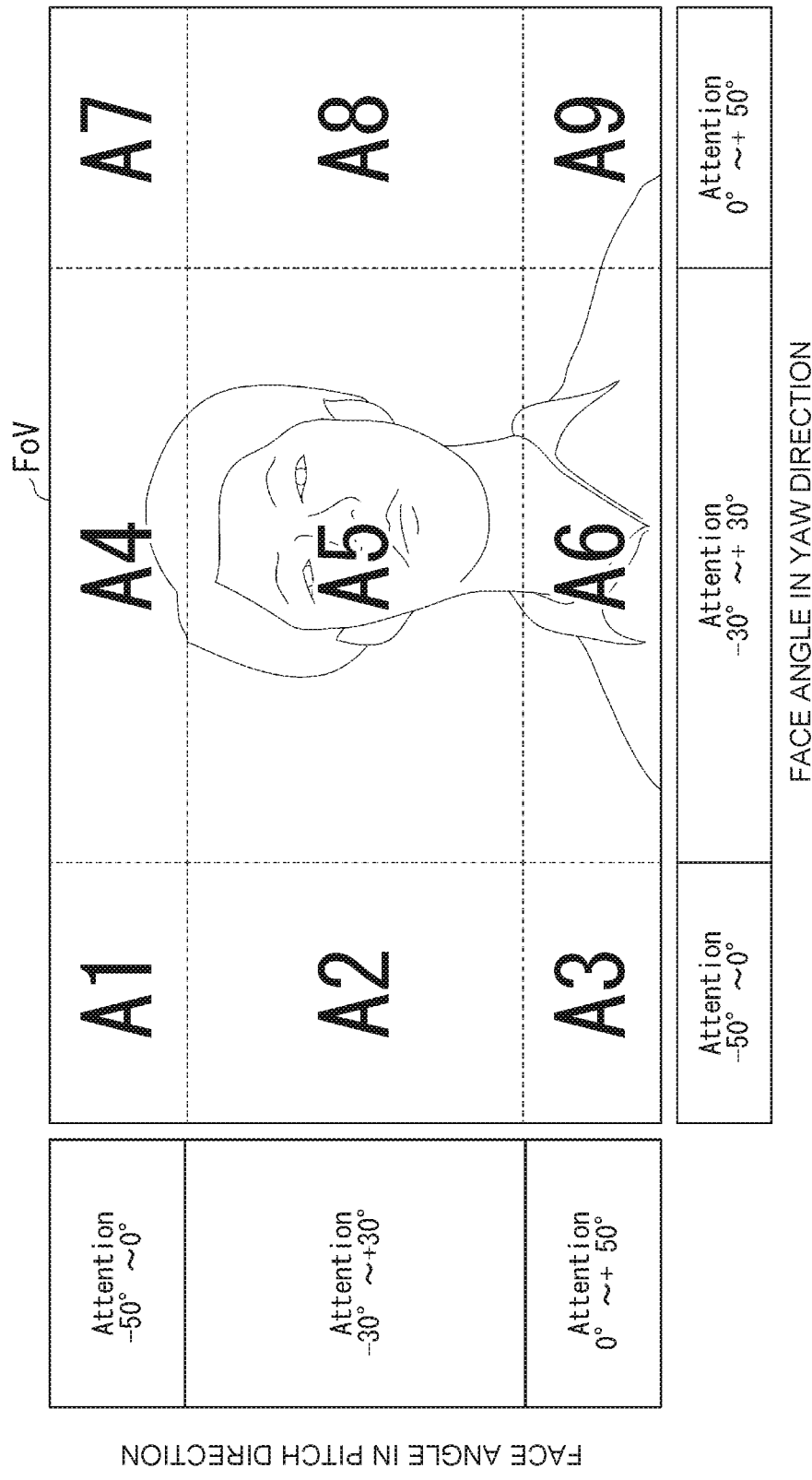
FIG. 5 is a diagram illustrating an example of a face direction determination method according to one or more embodiments.

FIG. 5 is a diagram illustrating an example of the face direction determination method according to one or more embodiments. The information processing apparatus 1 divides an image area of a captured image into nine areas (A1 to A9) of vertical 3×horizontal 3 to detect the position of the face area depending on in which area there is the center of the face area detected from the captured image. For each of the nine areas (A1 to A9), a face angle condition for determining whether or not the face is facing the direction of the display unit 110 (whether or not the user is looking at the display screen) is defined. Note that the state where the face is facing the direction of the display unit 110 (the state where the user is looking at the display screen) is called "Attention" below. On the other hand, the state where the face is not facing the direction of the display unit 110 (the state where the user is not looking at the display screen) is called "No Attention" below.

First, conditions for a face angle determined to be "Attention" in each area in the yaw direction will be described. In areas of A4, A5, and A6 near the center in the yaw direction, since the face is facing the direction of the display unit 110 when the face is facing forward, the conditions for the face angle in the yaw direction determined to be "Attention" are, for example, in a range of −30° to +30°.

Further, in areas of A1, A2, and A3 as the left end in the yaw direction, since the face is facing slightly to the right to turn the face in the direction of the display unit 110, the conditions for the face angle in the yaw direction determined to be "Attention" are, for example, in a range of −50° to 0°.

Further, in areas of A7, A8, and A9 as the right end in the yaw direction, since the face is facing slightly to the left to turn the face in the direction of the display unit 110, the conditions for the face angle in the yaw direction determined to be "Attention" are, for example, in a range of 0° to +50°.

Next, conditions for a face angle determined to be "Attention" in each area in the pitch direction will be described. In areas A2, A5, and A8 near the center in the pitch direction, since the face is facing the direction of the display unit 110 when the face is facing forward, the conditions for the face angle determined to be "Attention" in the pitch direction are, for example, in a range of −30° to +30°.

Further, in areas A1, A4, and A7 at the top end in the pitch direction, since the face is facing slightly downward to turn the face in the direction of the display unit 110, the conditions for the face angle determined to be "Attention" in pitch direction are, for example, in a range of −50° to 0°.

Further, in areas A3, A6, and A9 at the bottom end in the pitch direction, since the face is facing slightly upward to turn the face in the direction of the display unit 110, the conditions for the face angle determined to be "Attention" in the pitch direction are, for example, within a range of 0° to +50°.

When both the conditions for the face angle determined to be "Attention" in the yaw direction and the conditions for the face angle determined to be "Attention" in the pitch direction are met in an area as the center of the face area among the nine areas A1 to A9, the area is determined to be "Attention," while when either or both of the conditions are not met, the area is determined to be "No Attention."

Note that, in the example of the face direction determination method illustrated in FIG. 5, the nine divided areas A1 to A9 are used to detect the position of the face area, but the area size and the division number are not limited to those in this example, and they can be set to any other size and any other division number. Further, the conditions for the face angle determined to be "Attention" in each area are not limited to those in this example, and the conditions can also be set arbitrarily.

Configurations of the information processing apparatus 1 according to one or more embodiments will be described in detail below.

[Hardware Configuration of Information Processing Apparatus]

Figure 6:
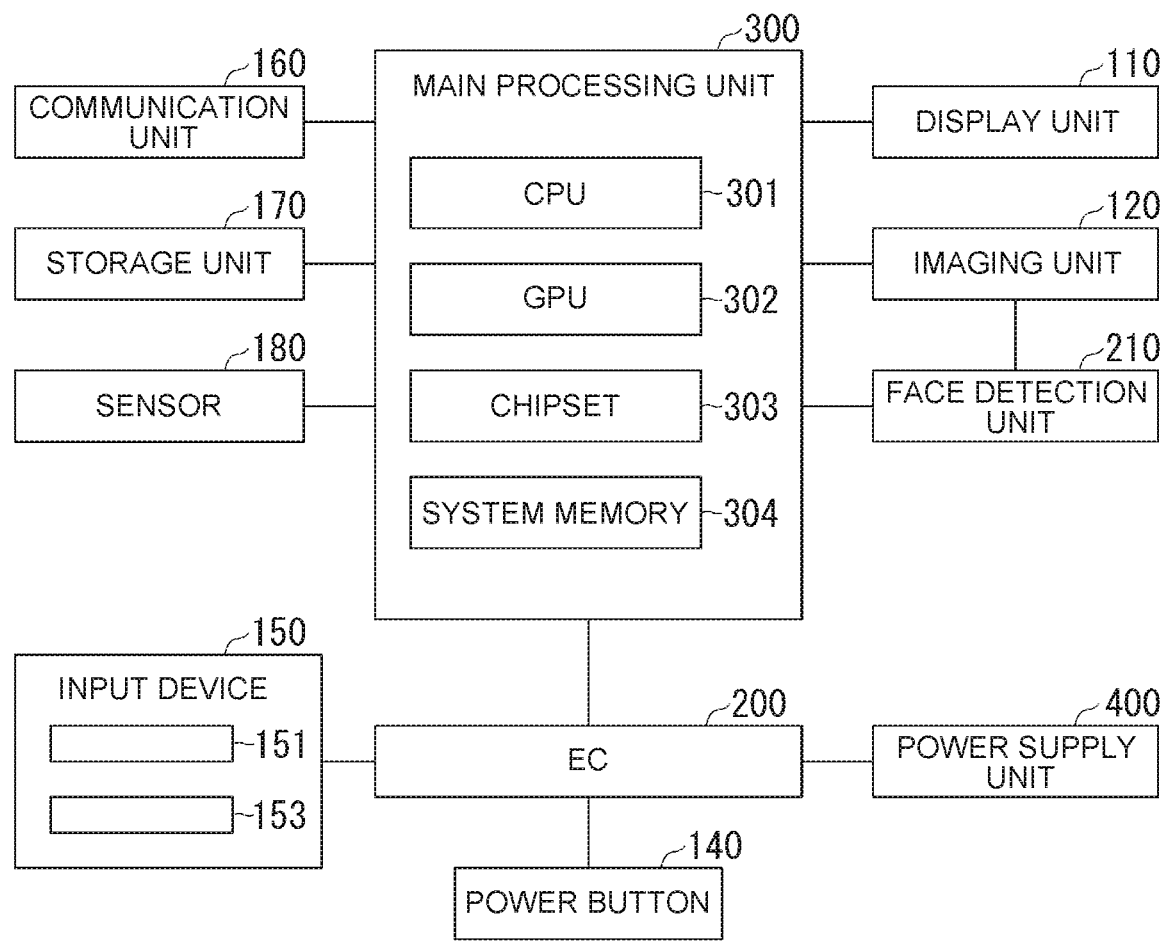
FIG. 6 is a schematic block diagram illustrating an example of the hardware configuration of the information processing apparatus according to one or more embodiments.

FIG. 6 is a schematic block diagram illustrating an example of the hardware configuration of the information processing apparatus 1 according to one or more embodiments. In FIG. 6, components corresponding to respective units in FIG. 1 are given the same reference numerals. The information processing apparatus 1 is configured to include the display unit 110, the imaging unit 120, the power button 140, an input device 150, a communication unit 160, a storage unit 170, a sensor 180, an EC (Embedded Controller) 200, a face detection unit 210, a main processing unit 300, and a power supply unit 400.

The display unit 110 displays display data (images) generated based on system processing executed by the main processing unit 300, processing of application programs running on the system processing, and the like.

The imaging unit 120 captures an image of an object within the predetermined imaging range (angle of view) in the direction (frontward) to face the inner face of the first chassis 10, and outputs the captured image to the main processing unit 300 and the face detection unit 210. For example, the imaging unit 120 includes a visible light camera (RGB camera) for capturing an image using visible light and an infrared camera (IR camera) for capturing an image using infrared light.

Note that the imaging unit 120 may be configured to include either one of the visible light camera and the infrared camera, or may be configured to include both of the visible light camera and the infrared camera.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of operation details.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM, a ROM, and the like. The storage unit 170 stores the OS, device drivers, various programs such as applications, and various data acquired by the operation of the programs.

The sensor 180 is a sensor to detect the movement and the orientation of the information processing apparatus 1, and the like, which is used, for example, to detect the posture (orientation), shaking, and the like of the information processing apparatus 1. For example, the sensor 180 includes acceleration sensors provided in the first chassis 10 and the second chassis 20, respectively. By providing the acceleration sensors respectively in the first chassis 10 and the second chassis 20, the respective postures (orientations) of the first chassis 10 and the second chassis 20, the hinge angle θ, and the like can be detected. Note that the sensor 180 may also be configured to include an angular velocity sensor, a tilt sensor, a geomagnetic sensor, or the like instead of or in addition to the acceleration sensors.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the function. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The face detection unit 210 is configured to include a processor to process image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or an unillustrated memory in the face detection unit 210.

For example, the face detection unit 210 processes the image data of the captured image acquired from the imaging unit 120 to perform face detection processing for detecting a face area from the captured image, detecting the orientation of a face of a face image in the detected face area, and the like. As the face detection method, any detection method using a face detection algorithm for detecting a face based on facial feature information, trained data (learned model) subjected to machine learning based on the facial feature information, a face detection library, or the like can be applied.

Further, the face detection unit 210 executes HPD processing to detect a person present in front of the information processing apparatus 1 based on the detection result by the face detection processing. For example, in the HPD processing, when the face area is detected from the captured image by the face detection processing, the face detection unit 210 determines that the user is present in front of the information processing apparatus 1, while when no face area is detected from the captured image, the face detection unit 210 determines that the user is not present in front of the information processing apparatus 1. The face detection unit 210 transmits the determination result by the HPD processing to the main processing unit 300.

Further, the face detection unit 210 performs face direction determination processing to determine whether or not the face is facing the direction of the display unit 110 using the face direction determination method described with reference to FIG. 5. The face detection unit 210 determines the orientation of the face relative to the display unit 110 based on the position of the face area and the orientation of the face detected from the captured image, and transmits the determination result to the main processing unit 300. This functional configuration of the face detection unit 210 to execute the face direction determination processing will be described in detail later with reference to FIG. 7.

The main processing unit 300 is configured to include a CPU (Central Processing Unit) 301, a GPU (Graphic Processing Unit) 302, a chipset 303, and a system memory 304, where processing of various application programs is executable on the OS (Operating system) by system processing on the OS.

The CPU 301 is a processor to execute processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like. Further, the CPU 301 executes screen brightness control processing to control the screen brightness of the display unit 110 based on the determination result of the face direction determination processing by the face detection unit 210 described above.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200. Further, the chipset 303 has a function as a sensor hub. For example, the chipset 303 acquires the output of the sensor 180 to detect the posture (orientation) of the information processing apparatus 1. The posture (orientation) of the information processing apparatus 1 is, for example, the hinge angle θ between the first chassis and the second chassis, the orientation of the display screen of the display unit 110 provided on the first chassis, and the like. Further, the chipset 303 acquires the determination results of the HPD processing and the face direction determination processing from the face detection unit 210, and outputs the determination results to the CPU 301.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may also be integrated as one processor, or some or each of them may be configured as an individual processor, respectively. For example, in the normal operating state, the CPU 301, the GPU 302, and the chipset 303 are all operating, but in the standby state, only at least part of the chipset 303 is operating.

[Functional Configuration of Information Processing Apparatus]

Figure 7:
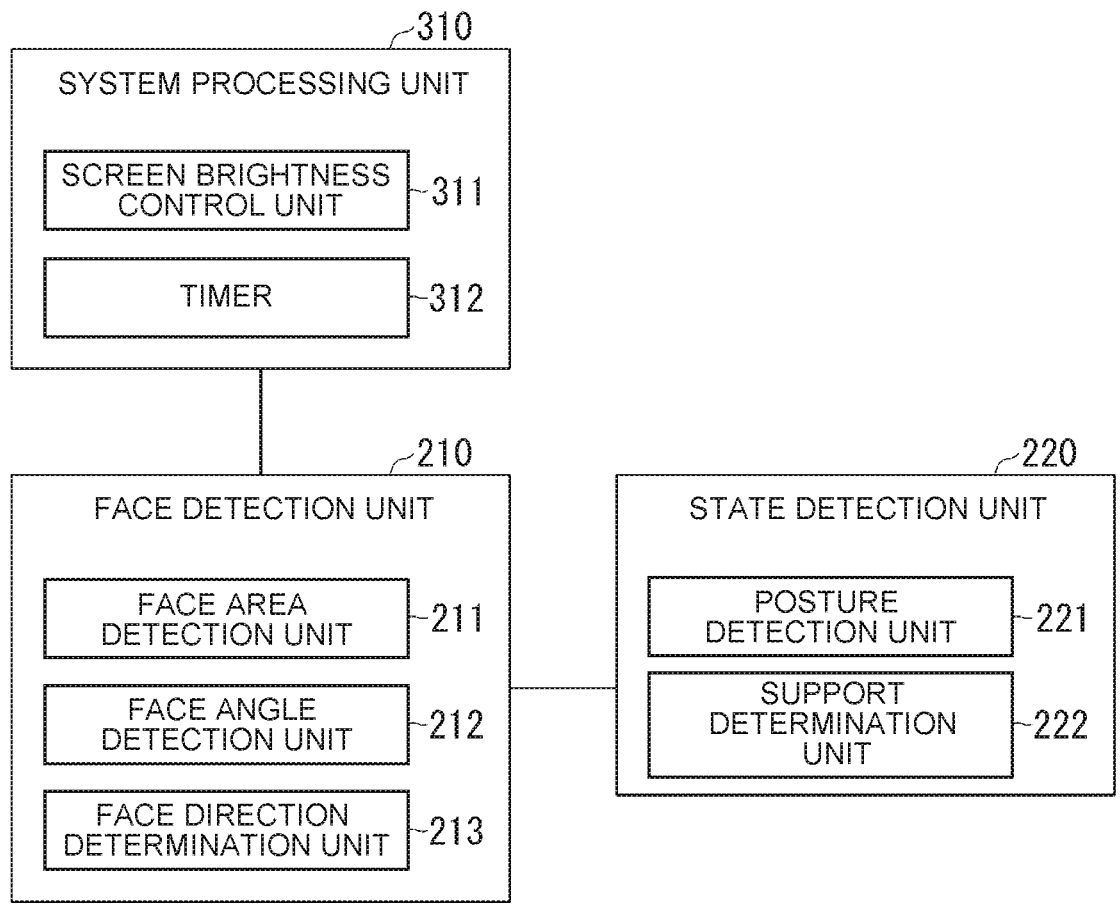
FIG. 7 is a schematic block diagram illustrating an example of the functional configuration of the information processing apparatus according to one or more embodiments.

Referring next to FIG. 7, the functional configuration of the information processing apparatus 1 to control the screen brightness based on the determination result by the face direction determination processing will be described.

FIG. 7 is a schematic block diagram illustrating an example of the functional configuration of the information processing apparatus 1 according to one or more embodiments. The information processing apparatus 1 includes the face detection unit 210, a state detection unit 220, and a system processing unit 310. The face detection unit 210 corresponds to the face detection unit 210 illustrated in FIG. 6, which includes a face area detection unit 211, a face angle detection unit 212, and a face direction determination unit 213 as functional components to perform face detection processing and face direction determination processing.

The face area detection unit 211 processes image data of a captured image acquired from the imaging unit 120 to detect a face area with a face captured therein from the captured image. For example, when a face area is detected from the captured image, the face area detection unit 211 outputs, as detection results, center position information (for example, the coordinates of the center position) of the face area in the image area (detection range FoV) of the captured image, and size information (vertical and horizontal coordinate dimensions) indicative of the size of the face area.

The face angle detection unit 212 detects the orientation of the face (face angle) captured in the face area detected from the captured image by the face area detection unit 211. For example, as described with reference to FIGS. 3A-3B, the face angle detection unit 212 detects the face angle in the yaw direction and the face angle in the pitch direction by setting, to 0°, the face angle when the face is facing forward.

The face direction determination unit 213 determines the orientation of the face relative to the display unit 110 based on the position of the face area detected by the face area detection unit 211, and the face angle detected by the face angle detection unit 212. For example, as described with reference to FIG. 5, the face direction determination unit 213 detects the position of the face area depending on in which of the areas A1 to A9, obtained by dividing the image area (detection range FoV) of the captured image, there is the center of the face area detected by the face area detection unit 211.

Then, when the face angle detected by the face angle detection unit 212 meets the conditions for the face angle (the face angle in the yaw direction and the face angle in the pitch direction) determined to be "Attention" in an area in which there is the center of the face area, the face direction determination unit 213 outputs, to the system processing unit 310, "Attention" information indicating a state where the face is facing the direction of the display unit 110 (a state where the user is looking at the display screen).

On the other hand, when the face angle does not meet the conditions for the face angle (the face angle in the yaw direction and the face angle in the pitch direction) determined to be "Attention" in the area in which there is the center of the face area, the face direction determination unit 213 outputs, to the system processing unit 310, "No Attention" information indicating a state where the face is not facing the direction of the display unit 110 (a state where the user is not looking at the display screen).

The state detection unit 220 is a functional component implemented by the main processing unit 300 illustrated in FIG. 6 executing a control program, which is a functional component executed, for example, by the chipset 303. The state detection unit 220 includes a posture detection unit 221 and a support determination unit 222.

The posture detection unit 221 detects the posture of the information processing apparatus 1 (for example, the orientation of the first chassis 10 and the orientation of the second chassis 20) based on the output of the sensor 180. For example, the posture detection unit 221 detects the hinge angle θ as the posture of the information processing apparatus 1. Further, the posture detection unit 221 may detect the orientation of the display unit 110 (the orientation of the display screen) as the posture of the information processing apparatus 1. The orientation of the display unit 110 (the orientation of the display screen) is an angle of the display screen of the display unit 110 (for example, an angle relative to the horizontal plane) changing depending on a change in hinge angle θ and the angle of the information processing apparatus 1 itself relative to the horizontal plane, and the like. This angle of the display screen of the display unit 110 (for example, the angle relative to the horizontal plane) is called the "display angle" below.

Note that when a camera shutter is provided in the imaging unit 120 of the first chassis 10, the state detection unit 220 may also detect the open/closed state of the camera shutter. When the camera shutter is in the open state, the imaging unit 120 can capture an image in front of the information processing apparatus 1, while when the camera shutter is in the closed state, no image cannot be captured in front of the information processing apparatus 1 because the front side of the information processing apparatus 1 is blocked by the camera shutter.

The support determination unit 222 determines whether or not to enable (whether or not to support) the face detection processing by the face detection unit 210 based on the hinge angle θ detected by the posture detection unit 221. For example, when the hinge angle θ is an angle enough to include the face of the user in the detection range FoV (for example, 90°≤hinge angle θ≤135°), the support determination unit 222 determines to enable the face detection processing. On the other hand, when the hinge angle θ is an angle at which the face of the user is not included in the detection range FoV (for example, hinge angle θ<90° or 135°<hinge angle θ), the support determination unit 222 determines to disable the face detection processing.

Note that the support determination unit 222 may also determine whether or not to enable the face detection processing by the face detection unit 210 based on the display angle detected by the posture detection unit 221. For example, when the display angle is enough to include the face of the user in the detection range FoV, the support determination unit 222 determines to enable the face detection processing. On the other hand, when the display angle is an angle at which the face of the user is not included in the detection range FoV, the support determination unit 222 determines to disable the face detection processing.

Further, when the camera shutter is provided in the imaging unit 120 of the first chassis 10, the support determination unit 222 may determine whether or not to enable the face detection processing by the face detection unit 210 based on the open/closed state of the camera shutter. For example, when the camera shutter is in the open state, the support determination unit 222 determines to enable the face detection processing, while when the camera shutter is in the closed state, the support determination unit 222 determines to disable the face detection processing.

The support determination unit 222 determines whether or not to enable the face detection processing by the face detection unit 210 based on any one or more detection results of the hinge angle θ, the display angle, the open/closed state of the camera shutter, and the like. When it is determined to enable the face detection processing based on the determination result of whether or not to enable this face detection processing, the face detection unit 210 executes the face detection processing, while when it is determined to disable the face detection processing, the face detection unit 210 does not execute the face detection processing.

The system processing unit 310 is a functional component implemented by the main processing unit 300 illustrated in FIG. 6 executing the OS program, which is a functional component executed, for example, by the CPU 301. For example, the system processing unit 310 includes a screen brightness control unit 311 and a timer 312 as functional components implemented by executing the OS program.

The screen brightness control unit 311 controls the screen brightness of the display unit 110 based on the determination result of the face direction by the face direction determination processing. For example, when acquiring the "No Attention" information from the face detection unit 210 in the normal operating state, the screen brightness control unit 311 controls the screen brightness to the low brightness. In other words, when it is determined that the orientation of the face detected by the face detection unit 210 is not facing the direction of the display unit 110, the screen brightness control unit 311 reduces the screen brightness.

Further, when acquiring the "Attention" information from the face detection unit 210 in such a state that the screen brightness is controlled to the low brightness, the screen brightness control unit 311 restores the screen brightness to the standard brightness. In other words, when it is determined that the orientation of the face detected by the face detection unit 210 is not facing the direction of the display unit 110 in the state where the screen brightness is reduced, the screen brightness control unit 311 restores the screen brightness to the standard brightness before being reduced.

The timer 312 is a timer for measuring a waiting time from the time when the "No Attention" information is acquired from the face detection unit 210 in the normal operating state until the screen brightness is controlled to the low brightness. When the "Attention" information is acquired before the elapse of a predetermined waiting time after the "No Attention" information is acquired, the screen brightness control unit 311 keeps the standard brightness without controlling the screen brightness to the low brightness. When the "Attention" information is not acquired during the predetermined waiting time after the "No Attention" information is acquired, the screen brightness control unit 311 controls the screen brightness to the low brightness. Thus, the information processing apparatus 1 can prevent the screen brightness from being controlled to the low brightness only when the user just looked away a little during using the information processing apparatus 1. The predetermined waiting time is preset, for example, to 10 seconds or the like. Note that this predetermined waiting time may also be settable by the user.

[Operation of Processing]

Figure 8:
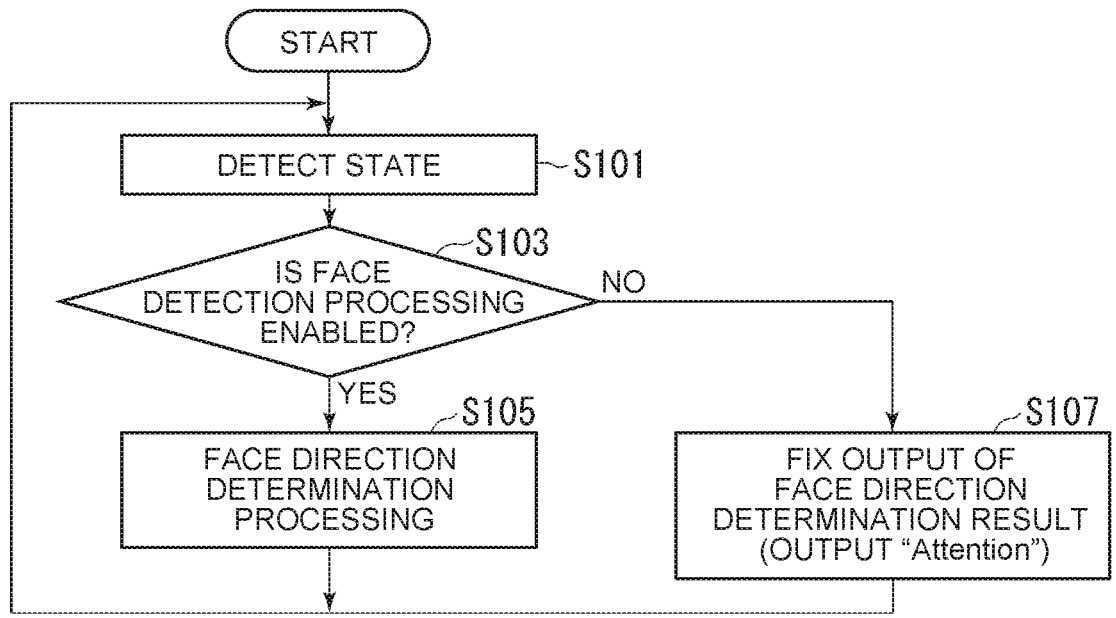
FIG. 8 is a flowchart illustrating an example of face detection execution determination processing according to one or more embodiments.

Next, the operation of face detection execution determination processing in which the state detection unit 220 determines whether or not to execute the face detection processing, face direction determination processing executed by the face detection unit 210, and screen brightness control processing executed by the system processing unit 310 will be described. Referring first to FIG. 8, the operation of face detection execution determination processing will be described.

FIG. 8 is a flowchart illustrating an example of face detection execution determination processing according to one or more embodiments.

(Step S101) The state detection unit 220 detects the posture of the information processing apparatus 1 (for example, the orientation of the first chassis 10 and the orientation of the second chassis 20) based on the output of the sensor 180. For example, the state detection unit 220 detects the hinge angle θ or the display angle as the posture of the information processing apparatus 1. Note that, when the camera shutter is provided in the imaging unit 120 of the first chassis 10, the state detection unit 220 may also detect the open/closed state of the camera shutter. Then, the state detection unit 220 proceeds to a process in step S103.

(Step S103) The state detection unit 220 determines whether or not to enable the face detection processing by the face detection unit 210 based on any one or more detection results of the hinge angle θ, the display angle, and the open/closed state of the camera shutter detected in step S101. When determining that the face detection processing is enabled (YES), the procedure proceeds to a process in step S105. On the other hand, when determining that the face detection processing is disabled (NO), the procedure proceeds to a process in step S107.

(Step S105) The face detection unit 210 executes face direction determination processing based on the face detection processing.

(Step S107) The face detection unit 210 fixes output of the determination result by the face direction determination processing to the output of the "Attention" information.

Figure 9:
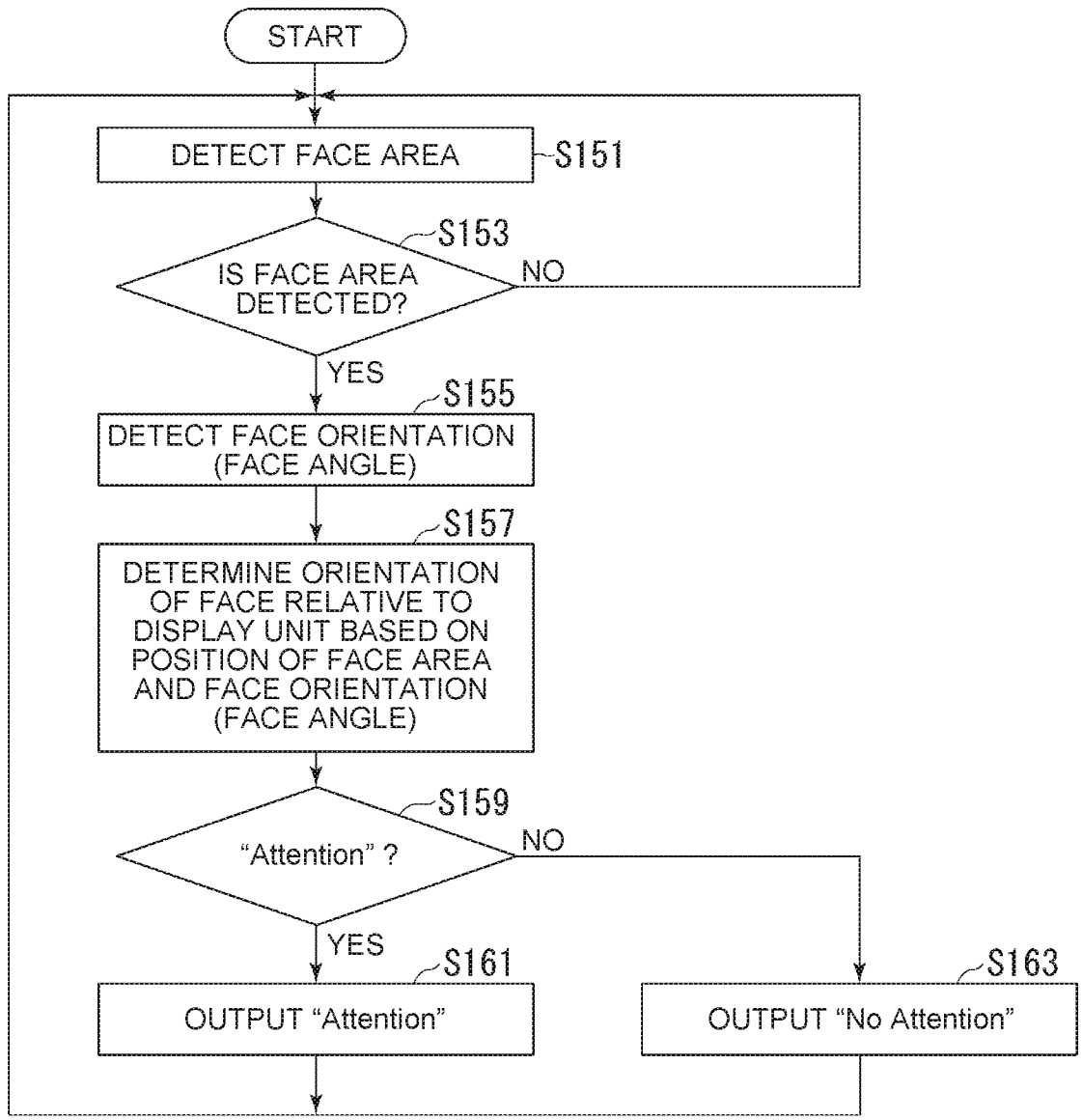
FIG. 9 is a flowchart illustrating an example of face direction determination processing according to one or more embodiments.

Referring next to FIG. 9, the operation of the face direction determination processing executed in step S105 of FIG. 8 will be described. FIG. 9 is a flowchart illustrating an example of the face direction determination processing according to one or more embodiments.

(Step S151) The face detection unit 210 detects a face area from a captured image captured by the imaging unit 120. For example, when a face area is detected from the captured image, the face area detection unit 211 outputs, as the detection results, center position information (for example, the coordinates of the center position) of the face area in the image area (detection range FoV) of the captured image, and size information (vertical and horizontal coordinate dimensions) indicative of the size of the face area. Then, the face detection unit 210 proceeds to a process in step S153.

(Step S153) The face detection unit 210 determines whether or not the face area is detected from the captured image in step S151. When determining that the face area is not detected from the captured image (NO), the face detection unit 210 outputs "Absence information" indicating that the user is not present in front of the information processing apparatus 1, and returns to the process in step S151. On the other hand, when determining that the face area is detected from the captured image (YES), the face detection unit 210 outputs "Presence" information" indicating that the user is present in front of the information processing apparatus 1, and the face detection unit 210 proceeds to a process in step S155.

(Step S155) The face detection unit 210 detects the orientation of the face (face angle) captured in the face area detected from the captured image in step S151. For example, as described with reference to FIGS. 3A-3B, the face angle detection unit 212 detects the face angle in the yaw direction and the face angle in the pitch direction by setting, to 0°, the face angle when the face is facing forward. Then, the face detection unit 210 proceeds to a process in step S157.

(Step S157) The face detection unit 210 determines the orientation of the face relative to the display unit 110 based on the position of the face area detected from the captured image in step S151 and the orientation of the face (face angle) detected in step S155. For example, as described with reference to FIG. 5, the face detection unit 210 detects, as the position of the face area, an area in which there is the center of the face area among the areas A1 to A9 obtained by dividing the image area (detection range FoV) of the captured image. Then, the face detection unit 210 determines the orientation of the face relative to the display unit 110 depending on whether or not the face angle detected in step S155 meets the conditions for the face angle (the face angle in the yaw direction and the face angle in the pitch direction) determined to be "Attention" in the area in which there is the center of the face area. Then, the face detection unit 210 proceeds to a process in step S159.

(Step S159) The face detection unit 210 determines whether or not the conditions for the face angle determined to be "Attention" in step S157 are met. When determining that the conditions for the face angle determined to be "Attention" is met (YES), the face detection unit 210 proceeds to a process in step S161. On the other hand, when determining that the conditions for the face angle determined to be "Attention" is not met (NO), the face detection unit 210 proceeds to a process in step S163.

(Step S161) The face detection unit 210 outputs, to the system processing unit 310, the "Attention" information indicating the state where the face of the user is facing the direction of the display unit 110 (the state where the user is looking at the display screen).

(Step S163) The face detection unit 210 outputs, to the system processing unit 310, the "No Attention" information indicating the state where the face of the user is not facing the direction of the display unit 110 (the state where the user is not looking at the display screen).

Figure 10:
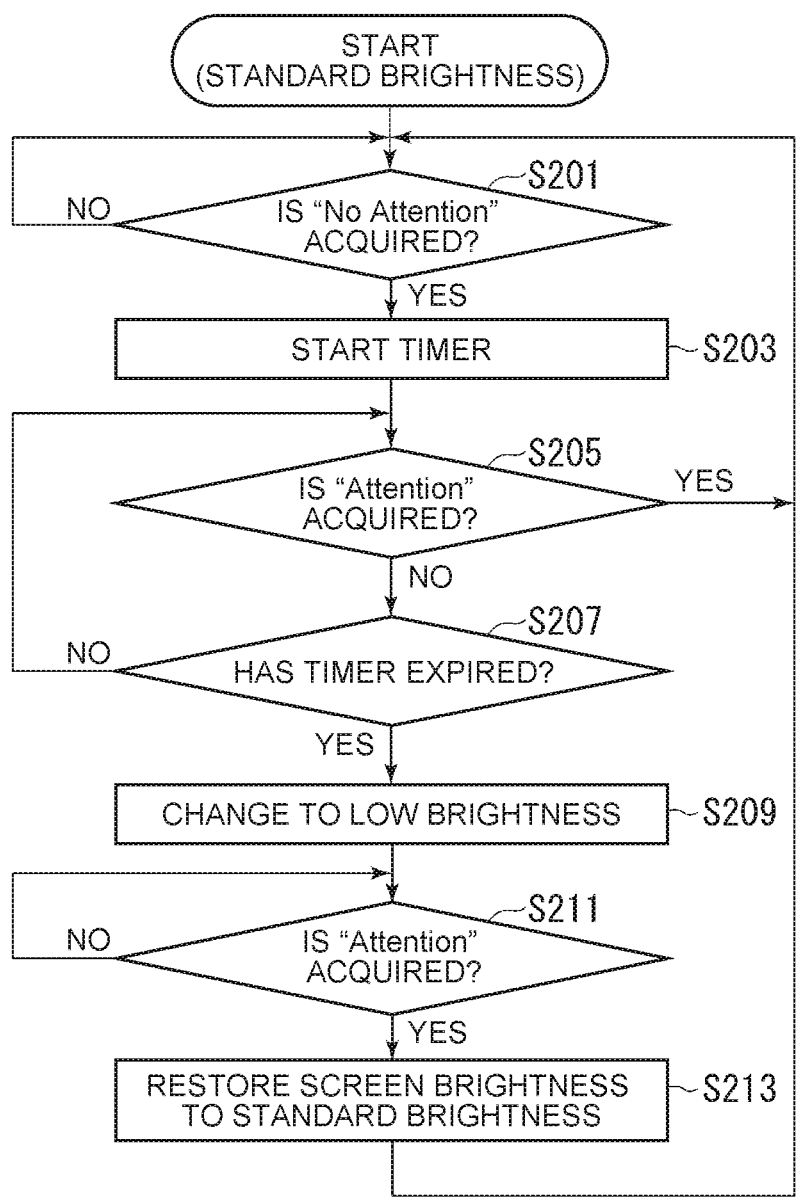
FIG. 10 is a flowchart illustrating an example of screen brightness control processing according to one or more embodiments.

Referring next to FIG. 10, the operation of the screen brightness control processing executed by the system processing unit 310 will be described. FIG. 10 is a flowchart illustrating an example of the screen brightness control processing according to one or more embodiments. Here, it is assumed that the face of the user is facing the direction of the display unit 110 in the normal operating state of the information processing apparatus 1 and the screen brightness is set to the standard brightness.

(Step S201) The screen brightness control unit 311 determines whether or not the "No Attention" information is acquired from the face detection unit 210. When determining that the "No Attention" information is not acquired (NO), the screen brightness control unit 311 performs the process in step S201 again. On the other hand, when determining that the "No Attention" information is acquired (YES), the screen brightness control unit 311 starts measuring the waiting time using the timer 312 (step S203). Then, the screen brightness control unit 311 proceeds to a process in step S205.

(Step S205) The screen brightness control unit 311 determines whether or not the "Attention" information is acquired from the face detection unit 210. When determining that the "Attention" information is not acquired (NO), the screen brightness control unit 311 proceeds to a process in step S207.

(Step S207) The screen brightness control unit 311 determines whether or not the predetermined waiting time (for example, 10 seconds) has elapsed based on the value of the timer 312 (that is, whether or not the timer has expired). When determining that the predetermined waiting time (for example, 10 seconds) has not elapsed (that is, that the timer has not expired) (NO in step S207), the screen brightness control unit 311 returns to the process in step S205. When determining that the "Attention" information is acquired before the elapse of the predetermined waiting time (for example, 10 seconds) (YES in step S205), the screen brightness control unit 311 returns to the process in step S201. At this time, the timer 312 is reset.

On the other hand, when determining in step S207 that the predetermined waiting time (for example, 10 seconds) has elapsed (YES in step S207), the screen brightness control unit 311 changes the screen brightness to the low brightness (step S209). Then, the screen brightness control unit 311 proceeds to a process in step S211.

(Step S211) The screen brightness control unit 311 determines whether or not the "Attention" information is acquired from the face detection unit 210. When determining that the "Attention" information is not acquired (NO), the screen brightness control unit 311 performs the process in step S211 again. On the other hand, when determining that the "Attention" information is acquired (YES), the screen brightness control unit 311 restores the screen brightness to the standard brightness (step S213).

As described above, the information processing apparatus 1 according to one or more embodiments includes: a memory (for example, the system memory 304) which temporarily stores image data of an image (captured image) captured by the imaging unit 120. Further, the information processing apparatus 1 includes the face detection unit 210 and the CPU 301 as an example of a processor. The face detection unit 210 processes the image data of the captured image stored in the above memory to execute face detection processing to detect a face area with a face captured therein and the orientation of the face from the captured image. Further, the CPU 301 executes brightness control processing to control the screen brightness of the display unit 110 based on the position of the face area and the orientation of the face detected by the above face detection processing.

Thus, even if the user's posture changes slightly, the information processing apparatus 1 can properly detect whether or not the user is looking at the display screen to control the screen brightness of the display screen.

For example, the face detection unit 210 performs the face direction determination processing to determine the orientation of the face relative to the display unit 110 based on the position of the face area and the orientation of the face detected by the face detection processing. Then, in the brightness control processing, the CPU 301 controls the screen brightness of the display unit 110 based on the determination result by the face direction determination processing.

Thus, since the information processing apparatus 1 can properly determine the orientation of the face relative to the display screen even if the user's posture changes slightly, the information processing apparatus 1 can properly detect whether or not the user is looking at the display screen to control the screen brightness of the display screen.

Further, the information processing apparatus 1 includes the first chassis 10 with the display unit 110 provided thereon, and the second chassis 20 connected to the first chassis 10 through the hinge mechanism 15, and the information processing apparatus 1 is foldable from the state where the inner face (first face) of the first chassis 10 on which the display unit 110 is provided and the inner face (second face) of the second chassis 20 are open to the direction facing each other depending on a change in hinge angle θ by the hinge mechanism 15. The information processing apparatus 1 includes the chipset 303 as the example of the processor to further perform hinge angle detection processing to detect the hinge angle θ. Then, in the face direction determination processing, the face detection unit 210 may also determine the orientation of the face relative to the display unit 110 based on the position of the face area and the orientation of the face detected by the face detection processing, and the hinge angle θ detected by the hinge angle detection processing.

Thus, even if the face angle of the user captured by the imaging unit 120 changes depending on a change in hinge angle θ, the information processing apparatus 1 can calibrate the conditions for the face angle determined to be "Attention" depending on the change in hinge angle θ to properly determine whether or not the user is looking at the display screen.

Further, the face detection unit 210 controls whether or not to perform the face direction determination processing based on the hinge angle θ detected by the hinge angle detection processing.

Thus, when the face of the user does not fall within the detection range FoV due to the hinge angle θ, the information processing apparatus 1 can disable the face direction determination processing from being executed, and hence power can be saved.

Further, the information processing apparatus 1 may include the chipset 303 as the example of the processor to further perform display direction detection processing to detect the display angle (the orientation of the display unit 110). Then, in the face direction determination processing, the face detection unit 210 may determine the orientation of the face relative to the display unit 110 based on the position of the face area and the orientation of the face detected by the face detection processing, and the display angle detected by the display direction detection processing.

Thus, even when the face angle of the user captured by the imaging unit 120 changes due to a change in display angle, the information processing apparatus 1 can calibrate the conditions for the face angle determined to be "Attention" depending on the change in display angle to properly determine whether or not the user is looking at the display screen.

Further, the face detection unit 210 controls whether or not to perform the face direction determination processing based on the display angle detected by the display direction detection processing.

Thus, when the face of the user does not fall within the detection range FoV due to the display angle, the information processing apparatus 1 can disable the face direction determination processing from being executed, and hence power can be saved.

Further, a control method for the information processing apparatus 1 according to one or more embodiments includes: a face detection step of causing the face detection unit 210 to process image data of the captured image stored in the above memory in order to detect a face area with a face captured therein from the captured image and the orientation of the face; and a brightness control step of causing the CPU 301 to control the screen brightness of the display unit 110 based on the position of the face area and the orientation of the face detected by the above face detection processing step.

Thus, even if the user's posture changes slightly, the information processing apparatus 1 can properly detect whether or not the user is looking at the display screen to control the screen brightness of the display screen.

Next, one or more embodiments of the present invention will be described.

In one or more embodiments, face direction determination processing when the information processing apparatus 1 is used by connecting an external display will be described. When the external display is connected, the information processing apparatus 1 can determine not only the orientation of the face relative to the display unit 110, but also the orientation of the face relative to the external display.

Figure 11:
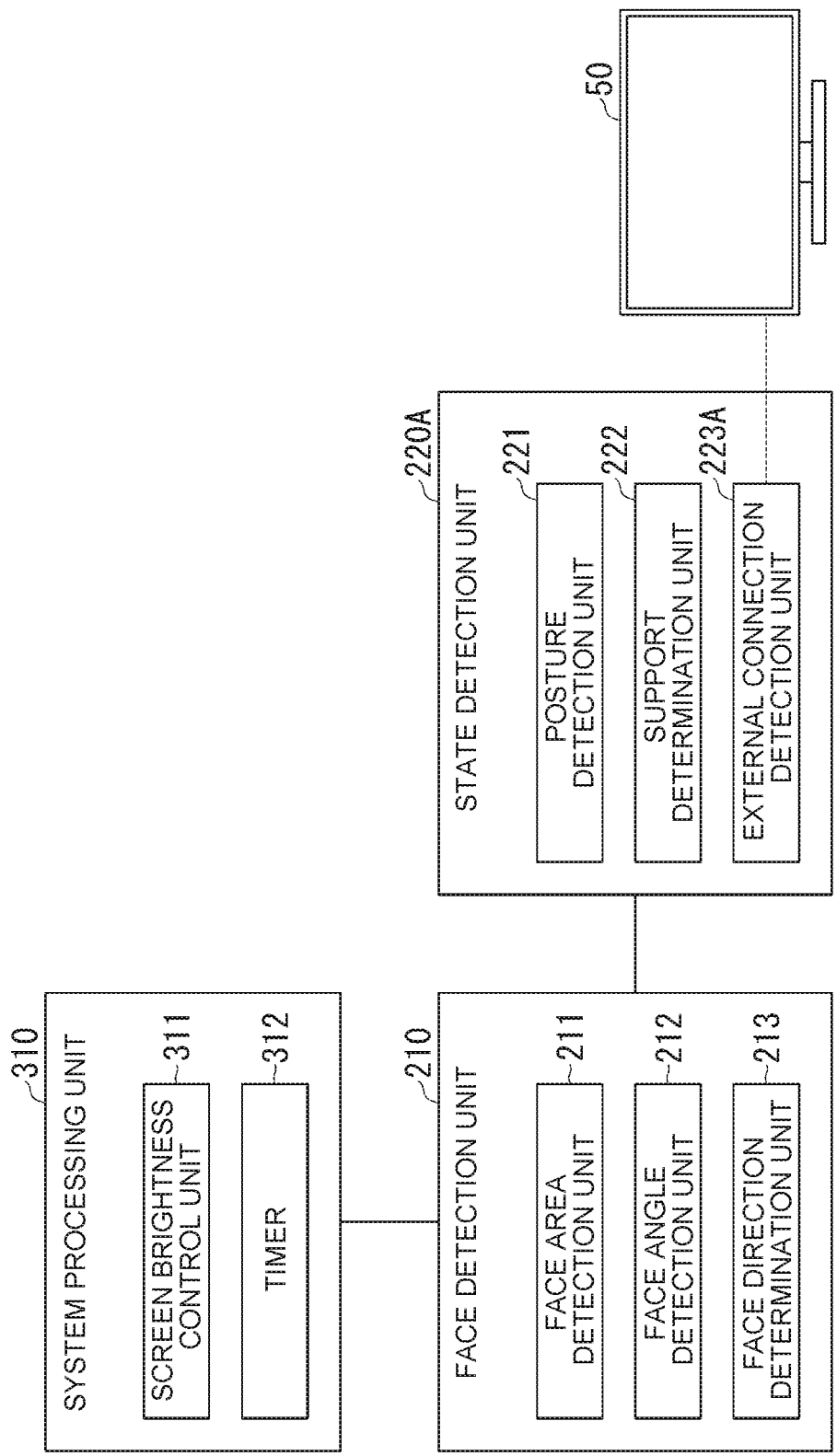
FIG. 11 is a schematic block diagram illustrating an example of the functional configuration of the information processing apparatus according to one or more embodiments.

FIG. 11 is a schematic block diagram illustrating an example of the functional configuration of the information processing apparatus 1 according to one or more embodiments. In FIG. 11, components corresponding to respective units in FIG. 7 are given the same reference numerals. The information processing apparatus 1 includes the face detection unit 210, a state detection unit 220A, and the system processing unit 310. The state detection unit 220A is different from the state detection unit 220 in FIG. 7 in that the state detection unit 220A includes an external connection detection unit 223A in addition to the posture detection unit 221 and the support determination unit 222.

The external connection detection unit 223A detects the connection with an external display 50. The connection between the information processing apparatus 1 and the external display 50 may be wired or wireless. For example, when detecting the connection with the external display 50, the external connection detection unit 223A acquires the specifications of the external display 50 (screen size, resolution, and the like), position information indicative of the position of the external display 50 relative to the information processing apparatus 1, and the like.

As for the specifications of the external display 50, the external connection detection unit 223A acquires the specifications from the connected external display 50. Further, as for the position information of the external display 50 relative to the information processing apparatus 1, the external connection detection unit 223A acquires the position information from setting information on the display placement set in the display settings of the OS. Note that the external connection detection unit 223A may also acquire, from the display settings of the OS, display setting information indicating on which of the display unit 110 and the external display 50 the display is displayed when the display is displayed on both or either of the display unit 110 and the external display 50. The external connection detection unit 223A may further acquire setting information on the orientation of the screen set in the display settings of the OS.

The face direction determination unit 213 determines the orientation of the face relative to the external display 50 based on the position of the face area detected by the face area detection unit 211 and the face angle detected by the face angle detection unit 212. For example, the nine areas of A1 to A9 described with reference to FIG. 5 are applied to screen areas of the external display 50 to calibrate the conditions for the face angle (the face angle in the yaw direction and the face angle in the pitch direction) determined to be "Attention" in each area based on the position of the external display 50.

For example, when the position of the external display 50 is set on the right side of the display unit 110 when viewed from the user's perspective, the face direction determination unit 213 determines the orientation of the face by shifting, in a positive direction (for example, +40°), the conditions for the face angle in the yaw direction determined to be "Attention" illustrated in FIG. 5. Further, when the position of the external display 50 is set on the left side of the display unit 110 as viewed from the user's perspective, the face direction determination unit 213 determines the orientation of the face by shifting, in a negative direction (for example, −40°), the conditions for the face angle in in the yaw direction determined to be "Attention" illustrated in FIG. 5. Further, when the position of the external display 50 is set on the upper side of the display unit 110 as viewed from the user's perspective, the face direction determination unit 213 determines the orientation of the face by shifting, in the positive direction (for example, +40°), the conditions for the face angle in the pitch direction determined to be "Attention" illustrated in FIG. 5. Further, when the position of the external display 50 is set on the lower side of the display unit 110 as viewed from the user's perspective, the face direction determination unit 213 determines the orientation of the face by shifting, in the negative direction (for example, −40°), the conditions for the face angle in the pitch direction determined to be "Attention" illustrated in FIG. 5.

Note that the face direction determination unit 213 may also change the conditions for the face angle determined to be "Attention" based on the specifications (for example, screen size and the like) of the external display 50.

Figure 12:
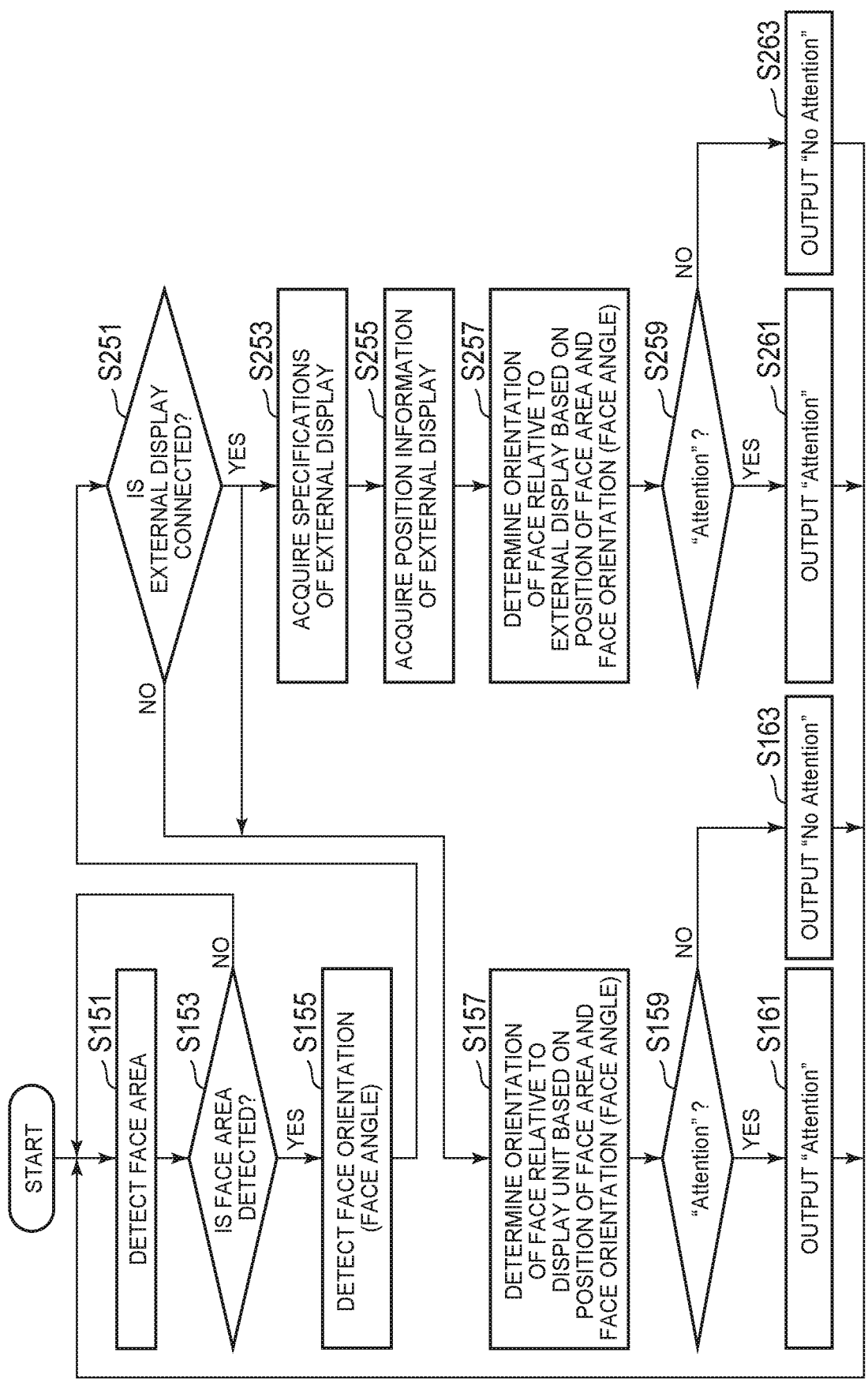
FIG. 12 is a flowchart illustrating an example of face direction determination processing according to one or more embodiments.

FIG. 12 is a flowchart illustrating an example of face direction determination processing according to one or more embodiments. In FIG. 12, processes corresponding to respective processes in FIG. 9 are given the same reference numerals. The face direction determination processing according to one or more embodiments is different from the example of the face direction determination processing illustrated in FIG. 9 in that, when the external display 50 is connected, not only the orientation of the face relative to the display unit 110 but also the orientation of the face relative to the external display 50 are determined. Here, processes different from those in the face direction determination processing illustrated in FIG. 9 will be described.

(Step S251) The face detection unit 210 determines whether or not the external display 50 is connected based on the detection result by the state detection unit 220A (the external connection detection unit 223A). When determining that the external display 50 is not connected (NO), the face detection unit 210 determines the orientation of the face relative to the display unit 110 by the processes in step S157 and subsequent steps. On the other hand, when determining that the external display 50 is connected (YES), the face detection unit 210 determines not only the orientation of the face relative to the display unit 110 by the processes in step S157 and subsequent steps, but also the orientation of the face relative to the external display 50 by processes in step S253 and subsequent steps.

(Step S253) The face detection unit 210 acquires the specifications of the external display 50 (screen size, resolution, and the like) from the state detection unit 220A, and proceeds to a process in step S255.

(Step S255) The face detection unit 210 acquires, from the state detection unit 220A, the position information indicative of the position of the external display 50 relative to the information processing apparatus 1, and proceeds to a process in step S257.

(Step S257) The face detection unit 210 determines the orientation of the face relative to the external display 50 based on the position of the face area detected from the captured image in step S151 and the orientation of the face (face angle) detected in step S155. For example, using conditions calibrated based on the position of the external display 50 from the conditions for the face angle determined to be "Attention" illustrated in FIG. 5, the face detection unit

210 determines the orientation of face relative to the external display 50 depending on whether or not the face angle detected in step S155 meets the conditions for the face angle determined to be "Attention" in the area in which there is the center of the face area. Then, the face detection unit 210 proceeds to a process in step S259.

(Step S259) The face detection unit 210 determines whether or not the orientation of the face relative to the external display 50 determined in step S257 meets the conditions for the face angle determined to be "Attention". When determining that it meets the conditions for the face angle determined to be "Attention" (YES), the face detection unit 210 proceeds to a process in step S261. On the other hand, when determining that it does not meet the conditions for the face angle determined to be "Attention" (NO), the face detection unit 210 proceeds to a process in step S263.

(Step S261) The face detection unit 210 outputs, to the system processing unit 310, the "Attention" information indicating the state where the face of the user is facing the direction of the display unit 110 (the state where the user is looking at the display screen).

(Step S263) The face detection unit 210 outputs, to the system processing unit 310, the "No Attention" information indicating the state where the face of the user is not facing the direction of the display unit 110 (the state where the user is not looking at the display screen).

Note that when the external display 50 is connected, only the orientation of the face relative to the external display 50 may be determined in the face direction determination processing without determining the orientation of the face relative to the display unit 110.

Thus, the information processing apparatus 1 according to one or more embodiments includes the chipset 303 as the example of the processor to further perform external connection detection processing to detect the connection with the external display 50 (an example of an external display device).

Then, when it is detected that the external display 50 is connected by the external connection detection processing, the face detection unit 210 determines the orientation of the face relative to the external display 50 in the face direction determination processing based on the position of the face area and the orientation of the face detected by the face detection processing, and the position of the external display 50.

Thus, even if the user's posture changes slightly when the user is using the external display 50, the information processing apparatus 1 can properly detect whether or not the user is looking at the display screen of the external display 50. Further, when the specifications of the external display 50 indicates that the screen brightness of the external display 50 can be controlled from the information processing apparatus 1, the information processing apparatus 1 can properly detect whether or not the user is looking at the display screen of the external display 50 to control the screen brightness of the display screen.

While the embodiments of this invention have been described in detail above with reference to the accompanying drawings, the specific configurations are not limited to those in the embodiments described above, and design changes are also included without departing from the scope of this invention. For example, the respective components described in the above embodiments can be combined arbitrarily.

Further, in the aforementioned embodiments, the configuration to detect a person (user) present in front of the information processing apparatus 1 using the imaging unit 120 is described, but a ranging sensor such as a ToF sensor may also be used together in addition to the imaging unit 120. Further, the configuration example in which the imaging unit 120 is built in the information processing apparatus 1 is described, but the present invention is not limited to this example. For example, the imaging unit 120 does not have to be built in the information processing apparatus 1, which may also be attachable to the information processing apparatus 1 (for example, onto any one of the side faces 10*a*, 10*b*, 10*c*, and the like) and communicably connected to the information processing apparatus 1 wirelessly or by wire as an external accessory of the information processing apparatus 1.

Further, the CPU 301 and the chipset 303 may be configured as individual processors, respectively, or configured to be integrated as one processor.

Further, in the aforementioned embodiments, the example in which the face detection unit 210 is provided separately from the CPU 301 and the chipset 303 is illustrated, but some or all of the functions of the face detection unit 210 may be provided in the chipset 303, or may be provided in a processor integrated with the CPU 301 or the chipset 303. For example, the CPU 301, the chipset 303, and the face detection unit 210 may be configured as individual processors, or configured to be integrated as one processor. Further, some or all of the functions of the face detection unit 210 may be provided in the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the embodiments mentioned above is not limited to the laptop PC, which may be, for example, a desktop PC or the like.

DESCRIPTION OF SYMBOLS 1 information processing apparatus
10 first chassis
20 second chassis
15 hinge mechanism
110 display unit
120 imaging unit
140 power button
150 input device
151 keyboard
153 touch pad
160 communication unit
170 storage unit
180 sensor
200 EC 210
210 face detection unit
211 face area detection unit
212 face angle detection unit
213 face direction determination unit
220 state detection unit
221 posture detection unit
222 support determination unit
223A external connection detection unit
300 main processing unit
301 CPU
302 GPU
303 chipset
304 system memory
310 system processing unit
311 screen brightness control unit
312 timer
400 power supply unit

What is claimed is:

1. An information processing apparatus comprising:
a memory which temporarily stores image data of an image captured by an imaging unit; and
a processor which processes the image data stored in the memory, wherein
the processor performs;
face detection processing to process the image data of the image stored in the memory in order to detect a face area with a face captured therein and an orientation of the face from the image,
brightness control processing to control screen brightness of a display unit based on a position of the face area and the orientation of the face detected by the face detection processing, and
face direction determination processing to determine an orientation of the face relative to the display unit based on the position of the face area and the orientation of the face from the image, wherein
in the brightness control processing, the processor controls the screen brightness of the display unit based on the face direction determination processing,
in the face direction determination processing, the captured image is separated into a plurality of regions, and
based on which of the plurality of regions that overlaps the position of the face area in the captured image, an attention state is determined based on different ranges of an angle of the orientation of the face detected by the face detection processing.

2. The information processing apparatus according to claim 1, further comprising:
a first chassis on which the display unit is provided; and
a second chassis connected to the first chassis through a hinge mechanism, wherein
the information processing apparatus is foldable from a state where a first face of the first chassis with the display unit provided thereon and a second face of the second chassis are open to a direction in which the first face and the second face face each other depending on a change in hinge angle by the hinge mechanism,
the processor further performs hinge angle detection processing to detect the hinge angle, and
in the face direction determination processing, the processor determines the orientation of the face relative to the display unit based on the position of the face area and the orientation of the face detected by the face detection processing, and the hinge angle detected by the hinge angle detection processing.

3. The information processing apparatus according to claim 2, wherein
the processor controls whether or not to perform the face direction determination processing based on the hinge angle detected by the hinge angle detection processing.

4. The information processing apparatus according to claim 1, wherein
the processor further performs display direction detection processing to detect an orientation of the display unit, and
in the face direction determination processing, the processor determines the orientation of the face relative to the display unit based on the position of the face area and the orientation of the face detected by the face detection processing, and the orientation of the display unit detected by the display direction detection processing.

5. The information processing apparatus according to claim 4, wherein
the processor controls whether or not to perform the face direction determination processing based on the orientation of the display unit detected by the display direction detection processing.

6. The information processing apparatus according to claim 1, wherein the processor further performs external connection detection processing to detect connection with an external display device, and when it is detected by the external connection detection processing that the image processing apparatus is connected with the external display device, the processor determines, in the face direction determination processing, an orientation of the face relative to the external display device based on the position of the face area and the orientation of the face detected by the face detection processing, and a position of the external display device relative to the display unit.

7. A control method for an information processing apparatus including: a memory which temporarily stores image data of an image captured by an imaging unit; and a processor which processes the image data stored in the memory, the control method comprising:
  causing the processor to process the image data of the image stored in the memory in order to detect a face area with a face captured therein and an orientation of the face from the image;
  performing face direction determination processing to determine an orientation of the face relative to a display unit based on a position of the face area and the orientation of the face from the image; and
  causing the processor to control screen brightness of a display unit based on a position of the face area and the orientation of the detected face, wherein
  the processor controls the screen brightness of the display unit based on the face direction determination processing,
  in the face direction determination processing, the captured image is separated into a plurality of regions, and
  based on which of the plurality of regions that overlaps the position of the face area in the captured image, an attention state is determined based on different ranges of an angle of the orientation of the face detected by the face detection processing.

8. The information processing apparatus according to claim 1, wherein the angle of the orientation is a yaw angle of the face relative to the display unit.

9. The information processing apparatus according to claim 1, wherein the angle of the orientation is a pitch angle of the face relative to the display unit.

* * * * *